United States Patent
Liensberger et al.

(10) Patent No.: US 10,635,681 B2
(45) Date of Patent: *Apr. 28, 2020

(54) FORMING DATA RESPONSIVE TO A QUERY

(71) Applicant: Microsoft Technology Licensing, LLC, Redmond, WA (US)

(72) Inventors: Christian Liensberger, Bellevue, WA (US); Ziv Kasperski, Redmond, WA (US); Stéphane Nyombayire, Bellevue, WA (US); Venkatesh Krishnan, Sammamish, WA (US); Santosh Balasubramanian, Seattle, WA (US); Kunal Mukerjee, Redmond, WA (US); Shankar L. Regunathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

This patent is subject to a terminal disclaimer.

(21) Appl. No.: 15/605,738

(22) Filed: May 25, 2017

(65) Prior Publication Data

US 2017/0262510 A1 Sep. 14, 2017

Related U.S. Application Data

(63) Continuation of application No. 14/172,445, filed on Feb. 4, 2014, now Pat. No. 9,672,256.

(51) Int. Cl.
*G06F 7/00* (2006.01)
*G06F 16/2458* (2019.01)
(Continued)

(52) U.S. Cl.
CPC ........ *G06F 16/2468* (2019.01); *G06F 16/248* (2019.01); *G06F 16/256* (2019.01)

(58) Field of Classification Search
CPC ......... G06F 17/30383; G06F 17/30418; G06F 17/30451; G06F 16/2468; G06F 16/256; G06F 16/248
(Continued)

(56) References Cited

U.S. PATENT DOCUMENTS 6,480,836 B1 11/2002 Colby et al.
6,915,294 B1 7/2005 Singh et al.
(Continued)

FOREIGN PATENT DOCUMENTS

CN 102142025 A 8/2011
EP 2541856 A1 1/2013

OTHER PUBLICATIONS

"Office Action Issued in European Patent Application No. 15708918.6", dated Feb. 8, 2018, 5 Pages.
(Continued)

*Primary Examiner* — Mohammed R Uddin
(74) *Attorney, Agent, or Firm* — Ray Quinney & Nebeker, P.C.; Thomas M. Hardman; Timothy J. Churna

(57) ABSTRACT

The present invention extends to methods, systems, and computer program products for forming data responsive to a query. Responding to a query can include selecting data views on top of data sources. A data catalog stores data elements from different data sources and stores links between data elements from the different data sources. A view can be selected for a query based on one or more of: classification of data included in the data catalog or prior usage of data included in the data catalog. A selected data view is populated with data elements from the data catalog using the links to determine that data elements spanning multiple data sources satisfy the query. The data catalog can be used to identify relationships between data elements from different data sources that would not otherwise be identified.

20 Claims, 4 Drawing Sheets

(51) Int. Cl.
*G06F 16/248* (2019.01)
*G06F 16/25* (2019.01)

(58) Field of Classification Search
USPC .............................. 707/705, 717, 740, 776
See application file for complete search history.

(56) References Cited

U.S. PATENT DOCUMENTS

| | | | |
|---|---|---|---|
| 7,634,492 | B2 | 12/2009 | Parker et al. |
| 7,899,803 | B2 | 3/2011 | Cotter et al. |
| 8,214,225 | B2 | 7/2012 | Rao et al. |
| 8,250,106 | B2 | 8/2012 | Kolovski et al. |
| 8,484,208 | B1* | 7/2013 | Raghavan .............. G06F 16/838 707/728 |
| 8,495,099 | B2 | 7/2013 | Maim |
| 2002/0133504 | A1 | 9/2002 | Vlahos et al. |
| 2005/0033726 | A1 | 2/2005 | Wu et al. |
| 2006/0136449 | A1 | 6/2006 | Parker et al. |
| 2006/0271529 | A1 | 11/2006 | Dhamija et al. |
| 2008/0172353 | A1* | 7/2008 | Lim .................. G06F 16/24564 706/47 |
| 2008/0201326 | A1 | 8/2008 | Cotter et al. |
| 2008/0228716 | A1* | 9/2008 | Dettinger .............. G06F 16/245 |
| 2009/0112806 | A1 | 4/2009 | Cheng et al. |
| 2009/0157812 | A1* | 6/2009 | Bavly .................... G06Q 10/10 709/204 |
| 2011/0191362 | A1 | 8/2011 | Williams et al. |
| 2013/0054642 | A1* | 2/2013 | Morin ............... G06F 16/24544 707/770 |

OTHER PUBLICATIONS

"First Office Action and Search Report Issued in Chinese Patent Application No. 201580007260.4", dated Oct. 12, 2018, 12 Pages.
"Automatically Create Database Views with Hibernate and Spring", Retrieved from <<https://web.archive.org/web/20090302191450/http://blog.richardadamdean.com/?p=197>>, Feb. 28, 2009, 5 Pages.
"Create Materialized View", Retrieved from <<https://docs.oracle.com/cd/B19306_01/server.102/b14200/statements_6002.htm>>, Retrieved Date: Nov. 20, 2013, 19 Pages.
"Notice of Allowance Issued in U.S. Appl. No. 14/172,445", dated Feb. 10, 2017, 16 Pages.
"Final Office Action Issued in U.S. Appl. No. 14/172,445", dated Jun. 20, 2016, 16 Pages.
"Non Final Office Action Issued in U.S. Appl. No. 14/172,445", dated Dec. 2, 2015, 11 Pages.
Azarbod, et al., "An Automated Fuzzy Active Database for Employee Performance Evaluation Using Oracle", In Proceedings of 4th IEEE International Conference on Computer System Applications, Mar. 8, 2006, 2 Pages.
Haas, et al., "Transforming Heterogeneous data with database Middleware: Beyond Integration", In Bulletin of the IEEE Computer Society Technical Committee on data Engineering, vol. 22, Issue 1, Mar. 1, 1999, pp. 31-36.
Liu, et al., "An Adaptive Approach to Query Mediation Across Heterogeneous Information Source", In Proceedings of the First IFCIS International Conference on Cooperative Information Systems, Jun. 19, 1996, pp. 144-156.
Miller, et al., "The Clio Project: Managing Heterogeneity", In Newsletter of ACM Sigmod Record, vol. 30, Issue 1, Mar. 1, 2001, pp. 78-83.
Ozsu, et al., "Principles of Distributed Database Systems—Third Edition—Chapters 4, 6, 17", In Book Principles of Distributed Database Systems, Third Edition, Published by Springer Science & Business Media, Feb. 24, 2011, 123 Pages.
"International Preliminary Report on Patentability Issued in PCT Application No. PCT/US2015/013634", dated May 13, 2016, 8 Pages.
"International Search Report and Written Opinion Issued in PCT Application No. PCT/US2015/013634", dated May 11, 2015, 13 Pages.
"Second Written Opinion Issued in PCT Application No. PCT/US2015/013634", dated Jan. 7, 2016, 7 Pages.
Roth, et al., "Don't Scrap It Wrap It! A Wrapper Architecture for Legacy Data Source", In Proceedings of The International Conference on Very Large Data Bases, Aug. 26, 1997, pp. 266-275.
"Summons to Attend Oral Proceedings Issued in European Patent Application No. 15708918.6", Mailed Date: Feb. 21, 2019, 8 Pages.

* cited by examiner

FORMING DATA RESPONSIVE TO A QUERY

CROSS-REFERENCE TO RELATED APPLICATIONS

This application is a continuation of and claims the benefit of and priority to U.S. patent application Ser. No. 14/172,445, entitled "Creating Data Views", filed Feb. 4, 2014 by Christian Liensberger et. al., the entire contents of which are expressly incorporated by reference.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In many environments, such as, for example, database environments and Web browsing environments, users often query for specified data from within a larger set of data. For example, a user can query a database for a view (or projection) of sales data for a particular customer. On the Web, a user may search for a specific data topic.

However, extracting meaningful views/projections from a data set can become difficult as the size of a data set increases. A user may need a requisite level of familiarity with a data set and an underlying data store mechanism as well as the schema in which the data set is stored, in order to extract meaningful views from the data set. Further, even if a meaningful view is extracted for a user, there is no guarantee the same view has any meaning to other users.

As such, individual users often spend time trying to gain domain knowledge and also understand how the application or system that produced the data stored the data. After performing these tasks, one user may be able to create views on top of data that others can consume.

However, even then, if schema or logic of how an application/system stores the data in a database changes, previously created views may become obsolete or no longer function. A user may be required to manually check these changes and update created views to match. Manual checking and updating is error prone and also requires essentially constant understanding and working with the data set.

BRIEF SUMMARY

The present invention extends to methods, systems, and computer program products for forming data responsive to a query. A query including one or more query terms is received. A data catalog is accessed. The data catalog stores data elements from a first data source and a second data source. The data catalog also stores relationships linking between a plurality of different and otherwise unconnected data elements in the first data source and in the second data source. The stored relationships are stored in the data catalog in accordance with one or more signals used to maintain the data catalog.

A data view is selected for the query based on one or more of: classification of data included in the data catalog or prior usage of data included in the data catalog. The data view is populated with a first data element and a second data element included in the data catalog. The first data element is from the first data source and the second data element is from the second data source.

Populating the data view includes determining that the first data element satisfies the one or more query terms. Populating the data view also includes accessing a relationship stored in the data catalog that links the first data element to the second data element. Populating the data view further includes determining that the second data element is also related to the one or more query terms based at least on the relationship linking the first data element to a second data element.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
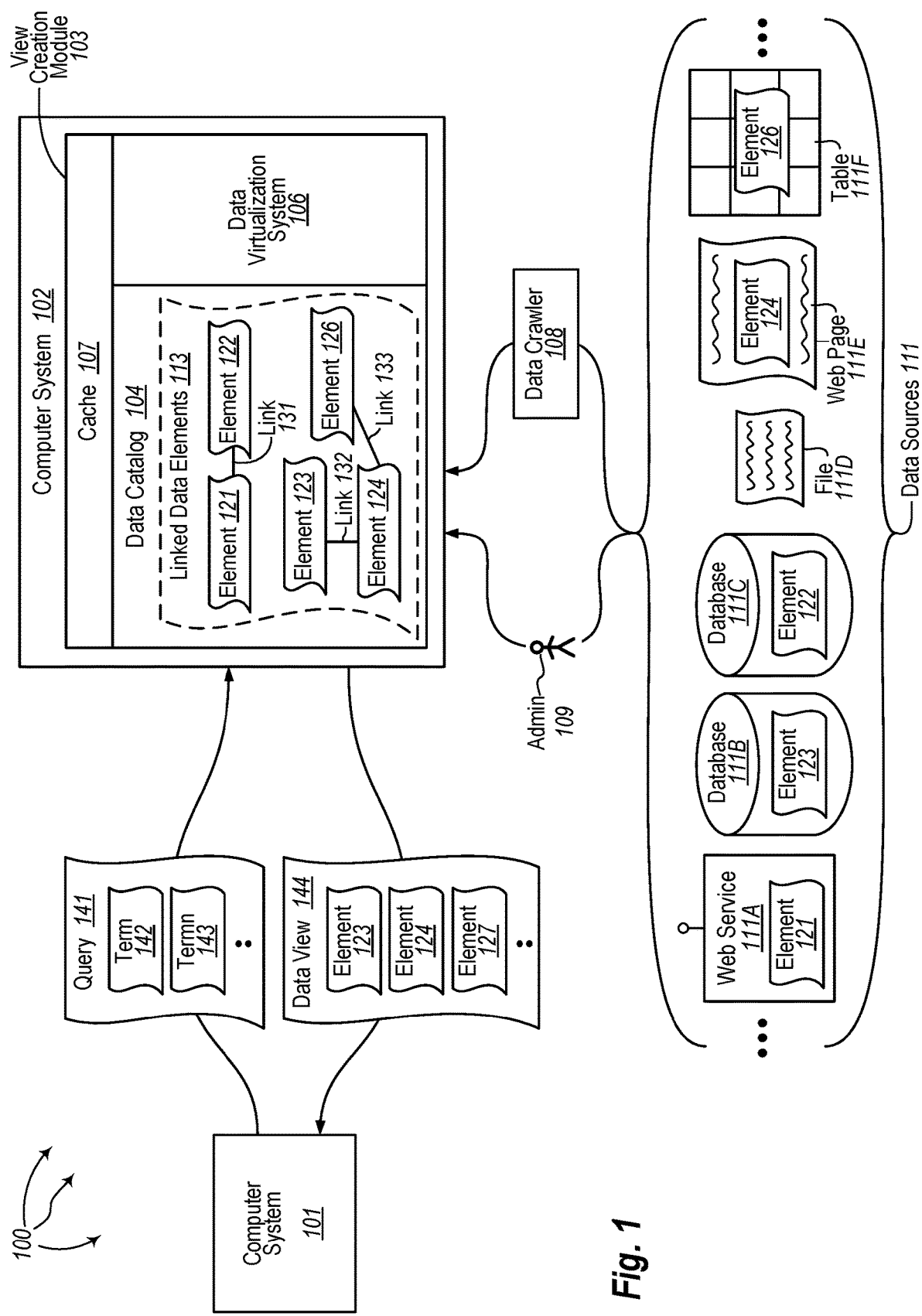
FIG. 1 illustrates an example computer architecture that facilitates creating data views.

The present invention extends to methods, systems, and computer program products for creating data views. A query including one or more query terms is received. In response to the query, a data catalog is accessed. The data catalog maintains links between a plurality of different and otherwise unconnected but related data from one or more data sources.

A data view that satisfies the one or more query terms is automatically inferred through reference to the data catalog. Inferring a data view includes determining that a first data source contains first data satisfying the one or more query terms. Inferring a data view also includes determining that a second data source contains second data satisfying the one or more query terms. Inferring a data view also includes assembling the first data and the second data into the data view. The data view is returned in response to receiving the query.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention allow automatic creation of data views/projections on top of data sources. A view can be created on one data source (by looking at one or multiple data elements within the data source) or by looking at multiple data sources (of the same or different data types) and combining elements into a view. Data sources can be any kind of data source, including but not limited to: databases, files, and Web services. Views can be picked from a set of predefined views, picked from views of another tenant (either statically or using fuzzy logic), selected based on data element classifications and/or data element relationship classifications, selected based on data usage (e.g., by looking at logs), etc.

FIG. 1 illustrates an example computer architecture 100 that facilitates creating data views. Referring to FIG. 1, computer architecture 100 includes computer system 101, computer system 102, data crawler 108, administrator 109, and data sources 111. Each of computer system 101, computer system 102, data crawler 108, administrator 109, and data sources 111 can be connected to one another over (or be part of) a network, such as, for example, a Local Area Network ("LAN"), a Wide Area Network ("WAN"), and even the Internet. Accordingly, computer system 101, computer system 102, data crawler 108, administrator 109, and data sources 111 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As depicted, computer system 102 includes view creation module 103. In general, view creation module 103 is configured to receive query terms and return a data view containing data relevant to the query terms. View creation module 103 further includes data catalog 104, data virtualization system 106, and cache 107. Data catalog 104 is configured to maintain data elements taken from data sources 111 and to maintain relationships (e.g., links) between data elements taken from data sources 111. In some embodiments, data catalog 104 maintains links between a plurality of different and otherwise unconnected but related data elements from one or more of data sources 111.

Data virtualization system 106 is configured to virtualize data of different formats and/or data types for processing by data catalog 104. In some embodiments, data virtualization system 106 converts data of different data formats and/or data types into a uniform format processable by data catalog 104. As such, view creation module 103 can access data from any of data sources 111 and data catalog 104 is able to process the data. In other embodiments, data catalog 104 understands and can process different data formats and/or data types.

Cache 107 is configured to store results of previous queries and other data elements. When returning a data view, data catalog can check 104 for data elements, prior retrieving data elements from data sources 111.

Data sources 111 can include virtually any type or kind of data source, including but not limited to: Web services, databases (including distributed and/or multi-tenant databases, such as, for example, cloud databases), tables, columns, files (including documents, spreadsheets, images, video, audio, etc.), Web pages, programming objects, etc. For example, as depicted, data sources 111 include: Web service 111A, database 111B, database 111C, file 111D, Web page 111E, and table 111F. A data source can be contained within another data source. For example, a table can be contained within a database, a file can be contained in a Web page, etc.

In general, data crawler 108 and administration 109 are configured to pull data from data sources 111 for use (and possible storage) at view creation module 103. Data crawler 108 and administration 109 can pull data from the same and/or different data sources. For example, administrator 109 can pull data from Web service 111A, database 111B, database 111C, and file 111D. Data crawler 108 can pull data from file 111D, Web page 111E, and table 111F. Data crawler 108 can be an automated process. Administrator 109 can be a human user that uses a computer system.

Figure 2:
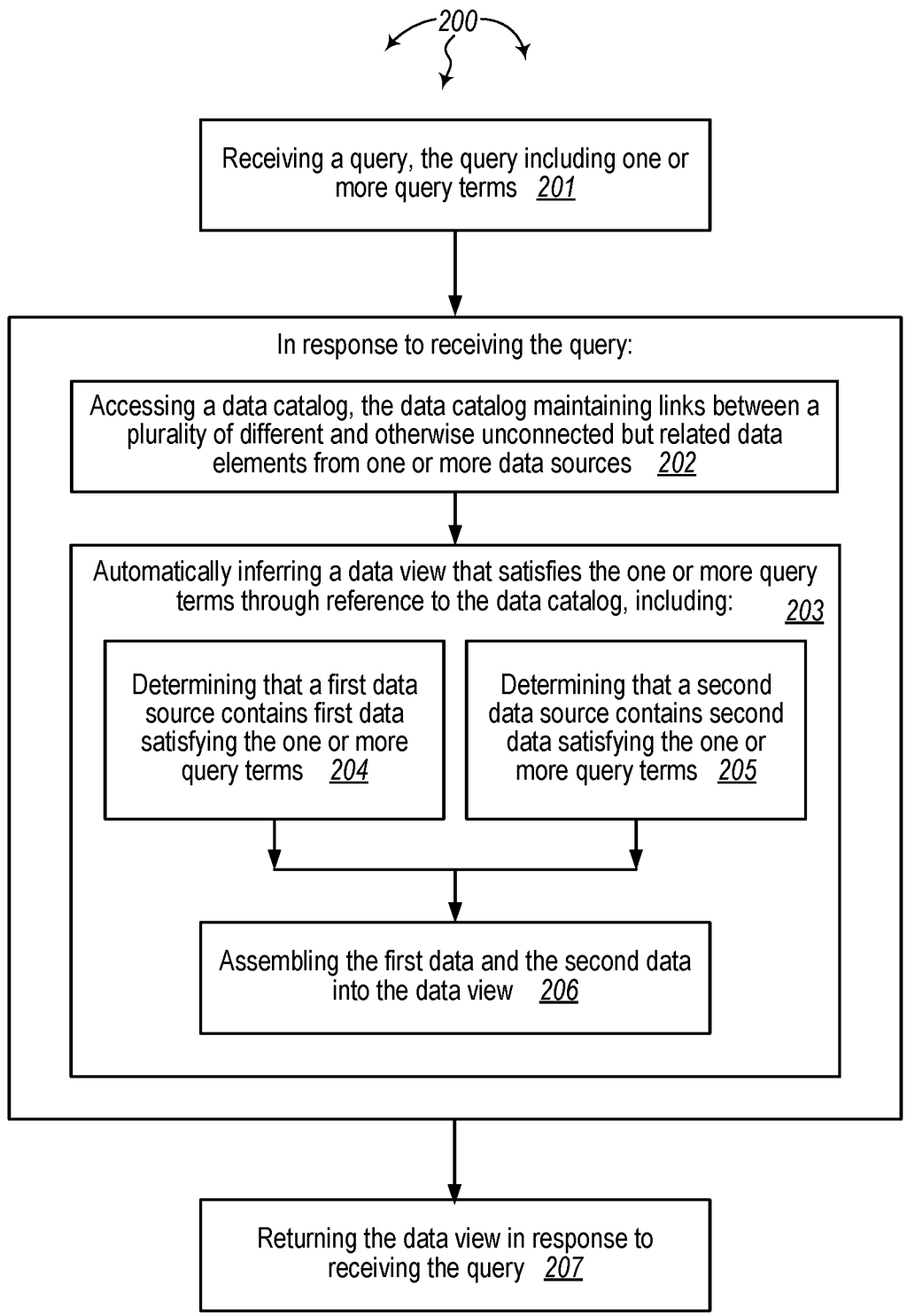
FIG. 2 illustrates a flow chart of an example method for creating data views.

FIG. 2 illustrates a flow chart of an example method 200 for creating data views. Method 200 will be described with respect to the components and data of computer architecture 100.

Method 200 includes receiving a query, the query including one or more query terms (201). For example, computer system 101 can send query 141, including query terms 142, 143, etc. to computer system 102. Computer system 102 can receive query 141 from computer system 101. For example, query term 142 could be the term "sales" and query term 143 could be the name of a company.

Method 200 incudes, in response to receiving the query, accessing a data catalog, the data catalog maintaining links between a plurality of different and otherwise unconnected but related data from one or more data sources (202). For example, in response to receiving query 141, view creation module 103 can access data catalog 104. As depicted, data catalog 104 includes linked data elements 113.

Linked data elements 113 indicate links between data elements contained in data sources 111. Linked data elements 113 can be used to indicate links between data elements in the same and/or different data sources. For example, link 131 indicates that data element 121 (from Web service 111A) and data element 122 (from database 111C) are linked.

Link 132 indicates that data element 123 (from database 111B) and data element 124 from Web page 111E are linked. Link 133 indicates that data element 124 and data element 126 (from table 111F) are linked. Based on links 132 and 133, it can also be inferred that data element 123 and data element 126 have a relationship. For example, data element 123 can be projected revenue for a prospective new customer, data element 124 can be contact information for the prospective new customer from the prospective new customer's Web page, and data element 126 can be the market capitalization of the prospective new customer from public records.

Method 200 includes, in response to receiving the query, automatically inferring a data view that satisfies the one or more query terms through reference to the data catalog (203). For example, in response to receiving query 141, view creation module 103 can infer data view 144. Data view 144 can satisfy one or more of query terms 142, 143, etc., through reference to data catalog 104.

Automatically inferring a data view can include determining that a first data source contains first data satisfying the one or more query terms (204). For example, view creation module 103 can determine that database 111B contains data element 123. Data element 123 or a portion thereof can at least partially satisfy one or more of query terms 142, 143, etc. Automatically inferring a data view can include determining that a second data source contains second data satisfying the one or more query terms (205). For example, view creation module 103 can determine that Web page 111E contains data element 124. Data element 124 or a portion thereof can at least partially satisfy one or more of query terms 142, 143, etc.

View creation module 103 can further determine that table 111F contains data element 126. Data element 126 or a portion thereof can at least partially satisfy one or more of query terms 142, 143, etc.

Upon identifying data elements 123, 124, and 126, view creation module 103 can refer to cache 107 to determine if any of data elements 123, 124, and 126 are stored in cache 107. If any of data elements 123, 124, and 126 are stored in cache 107, view creation module 103 can access the locally stored data elements from cache 107. For any of data elements 123, 124, and 126 not stored in cache 107, view creation module 103 can access those data elements from corresponding data sources 111.

Automatically inferring a data view can include assembling the first data and the second data into the data view (206). For example, view creation module 103 can assemble data element 123 and data element 124 into data view 144. View creation module can also derive or synthesize data element 127 from one or more of data elements 123, 124, and 126. Although not expressly included in a data source, data element 127 may at least partially satisfy one or more of query terms 142 and 143. The combination of data elements 123, 124, and 127 can satisfy query terms 142, 143, etc.

Method 200 includes, in response to receiving the query, returning the data view (207). For example, computer system 102 can return data view 144, including data elements 123, 124, and 127 to computer system 101. Computer system 101 can receive data view 144 from computer system 102.

Figure 3:
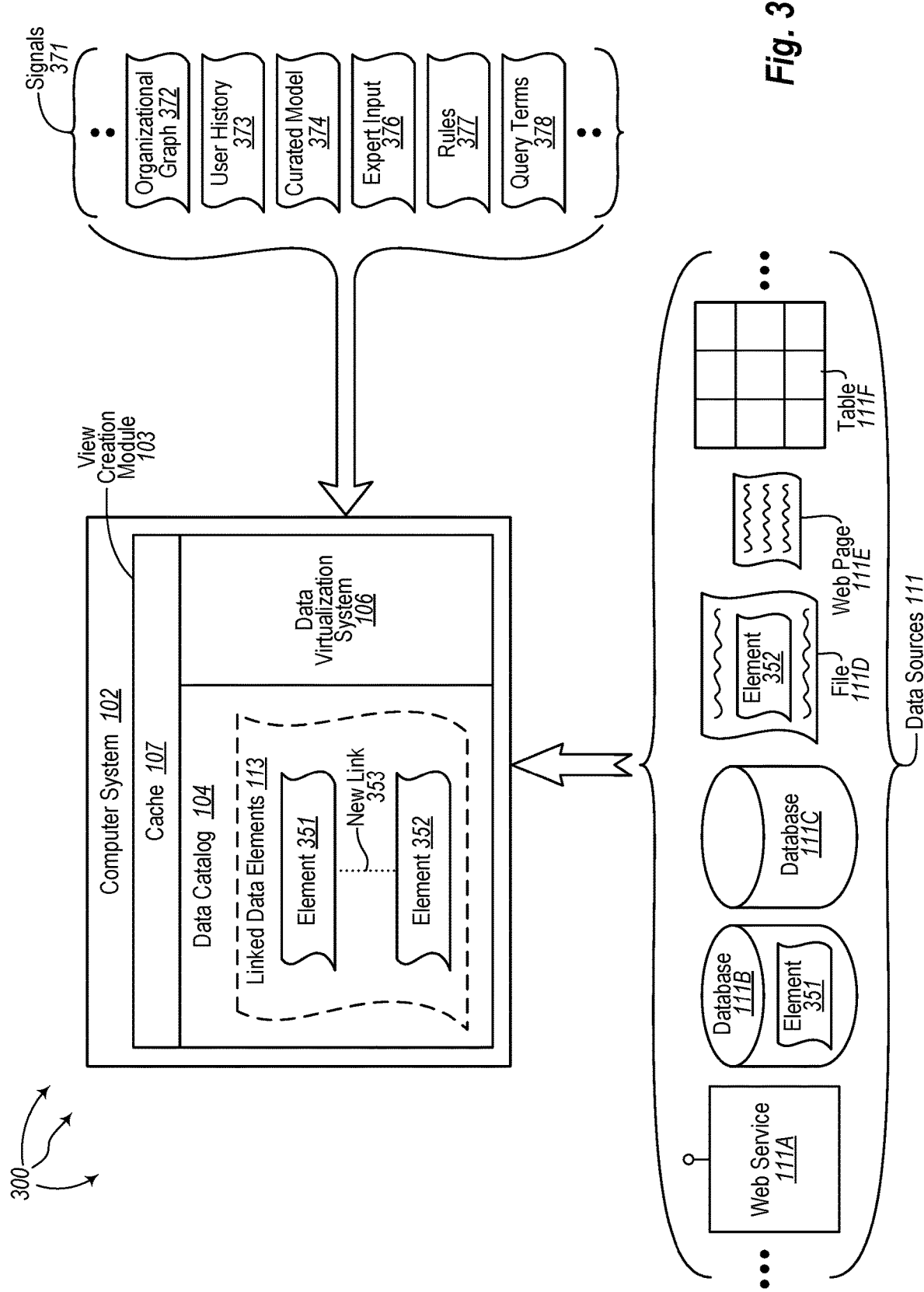
FIG. 3 illustrates an example computer architecture that facilitates maintaining a data catalog.

Turning to FIG. 3, the content of data catalog 104 and, more specifically of linked data elements 113, can change over time in response to received signals. Data elements included in linked data elements 113 can change. Similarly, links between data elements in linked data elements 113 can also change. For example, links between previously unconnected but related data elements can be discovered.

FIG. 3 illustrates an example computer architecture 300 that facilitates maintaining a data catalog. Referring to FIG. 3, computer architecture 300 includes computer system 102 and data sources 111. As described, computer system 102 and data sources 111 can be connected to (or be part of) a network and can create and exchange message related data over the network.

In general, computer system 102 can receive signals from signals 371. Any of a variety of different signals can be included in signals 371, including but not limited to: an organization graph of an enterprise (e.g., identifying data managed by same departments, same job title, same managers, peers, etc.), user history with respect to a view, user selection/click frequency of a view, user feedback, data quality, such as, for example, certification/official attribution of a data source, curated models (user identified connection between data elements), relationships identified from metadata or data layout, such as, for example, types of data, names of columns, etc., frequency of discovering the same data, multiple sets of data with the same or similar data layout or metadata layout, such as, for example, data with (potentially significant) overlay, expert input (e.g., promoting or demoting data or a link between data), user search terms, rules, etc. Rules can include indications to mix data, to not mix data, to user data as training, to always surface data, to never surface data, to ignore data, etc.

As depicted, signals 371 include organizational graph 372, user history 373, curated model 374, expert input 376, rules 377, and query terms 378.

Figure 4:
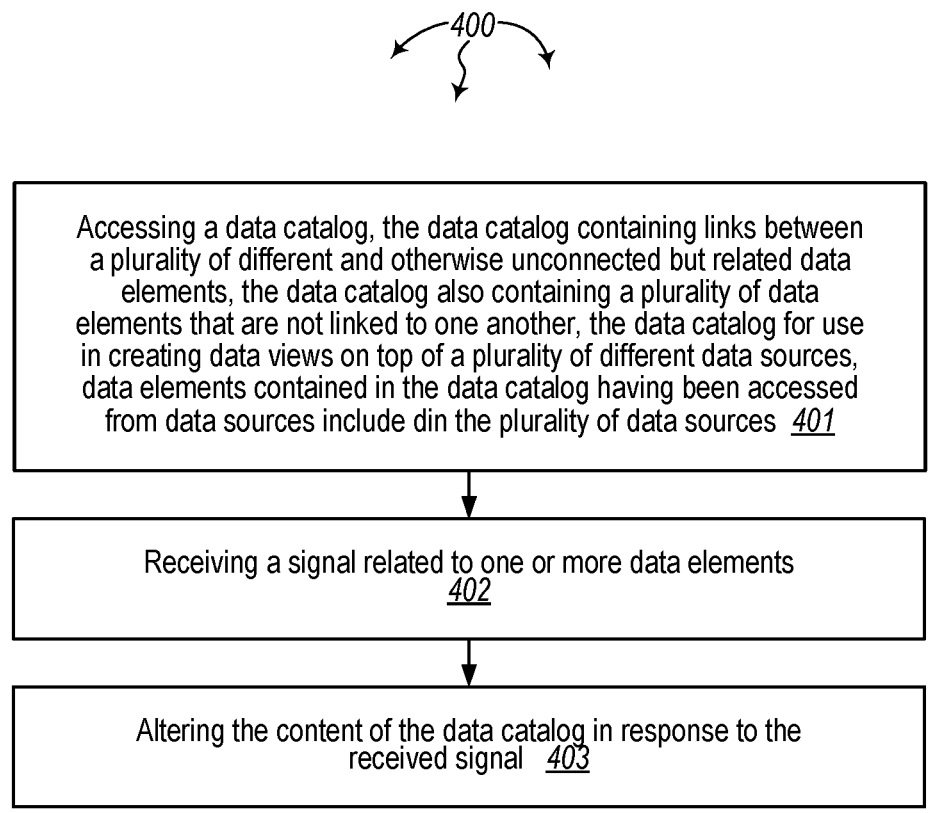
FIG. 4 illustrates a flow chart of an example method for maintaining a data catalog.

FIG. 4 illustrates a flow chart of an example method 400 for maintaining a data catalog. Method 400 will be described with respect to the components and data of computer architecture 300.

Method 400 includes accessing a data catalog, the data catalog containing links between a plurality of different and otherwise unconnected but related data elements, the data catalog also containing a plurality of data elements that are not linked to one another, the data catalog for use in creating data views on top of a plurality of different data sources (401). For example, view creation module 103 can access data catalog 104. Data catalog 104 can contain linked data elements 113 as well as indications of other data elements that are not linked.

Method 400 incudes receiving a signal related to one or more data elements (402). For example, computer system 102 can receive a signal 371 related to data element 351 (contained in database 111B) and data element 352 (contained in file 111D). Method 400 includes altering the content of the data catalog in response to the received signal (403). For example, view creation module 103 can alter data catalog 104 in response to the signal 371. In some embodiments, view creation module 103 identifies new link 353 between data elements 351 and 352 in response to the signal 371. View creation module 103 can then indicate new link 353 in linked data elements 113.

In other embodiments, view creation module 103 indicates a new data element in data catalog 104. In further embodiments, view creation module 103 removes a link between data elements in data catalog 104. In additional embodiments, view creation module 103 removes a data element from data catalog 104.

Accordingly, embodiments of the invention facilitate automated creation of views/projections on top of data. A view can be created on one data source (by looking at one or multiple elements within the data sources) or by looking at multiple data sources and combining their elements into one view. Data sources can be any kind of data source, including databases, files and web services.

In some environments, more specific mechanisms are used to create data views. For example, a data view responsive to query terms can be selected from a set of predefined data views. A system, such as, for example, view creation module 103, can consider a set of predefined views over available data sources, such as, for example, data sources 111. The predefined views can created by an administrator or added by a $3^{rd}$ party with knowledge of data sources and corresponding schema.

In a multi-tenant environment, a data view responsive to query terms for one tenant can be selected based on usage of the data view by another tenant. In a multi-tenant environment, a system, such as, for example, view creation module 103, can learn from others build. For example, two companies A and B may be using a view creation module in the cloud in isolation from one another. If in company A someone understood the schema of data source Y and in company B someone has a data source that looks like Y, the view creation module can propose views for company B since it learned from the views created for company A. Matching can be static (e.g., one-to-one matching) or fuzzy. With respect to fuzzy matching, a view creation module can propose parts of a view that fit and/or can adapt by combining multiple views even if some data elements do not precisely fit a view.

A system, such as, for example, view creation module 103, can infer a view from automatic classification of data. A view creation module can automatically classify data elements (e.g. tables, columns, etc.) and relationships between elements in corresponding data sources (e.g., data sources 111). Based on classifications, the view creation module can automatically propose views. For example, the view creation module can know that certain classified elements are usually not useful by themselves but if they are joined/matched with other elements of a specific other type they are usable by consumers.

A system, such as, for example, view creation module 103, can create usage specific views. For example, a view creation module can look back in time (e.g., at logs or other historical data) to identify how certain elements have been used to create views. If other data sources with similar elements become accessible to the view creation module, the view creation module can automatically suggest views for these other data sources.

Generally, inferring views can be done across one or more data sources, where the one or more data sources are of the same type or different data types (e.g. two SQL server databases, or a SQL Server database and an Excel file). Fuzzy creation can be used with any of the described mechanism and algorithms. When a construction of a full view is not possible, a partial view can be created. An administrator or users can be notified to fill in the blanks or make decisions with respect to parts of a view that are not automatically created.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, the computer system comprising:
a processor;
system memory coupled to the processor, the system memory storing instructions that are executable by the processor; and
the processor configured to execute the instructions stored in the system memory to form data responsive to a query, including the following:
receive the query, the query including one or more query terms;
access a data catalog, the data catalog storing data elements from a first data source and a second data source, the data catalog also storing relationships linking between a plurality of different and otherwise unconnected data elements in the first data source and in the second data source, the stored relationships stored in the data catalog in accordance with one or more signals used to maintain the data catalog;
classify one or more relationships between data elements in the first data source and the second data source;
select a data view for the query based on classification of relationships between data included in the first data source and the second data source; and
populate the data view with a first data element and a second data element included in the data catalog, the first data element from the first data source and the second data element from the second data source, including:
determine that the first data element satisfies the one or more query terms;
access a relationship stored in the data catalog, the relationship linking the first data element to the second data element; and
determine that the second data element is also related to the one or more query terms based at least on the relationship linking the first data element to the second data element.

2. The computer system of claim 1, wherein the processor configured to execute the instructions stored in the system memory to populate the data view with the first data element and the second data element included in the data catalog comprises the processor configured to execute the instructions stored in the system memory to assemble the first data element and the second data element into the data view based on the determination that the second data element is also related to the one or more query terms based at least on the relationship linking the first data element to a second data element.

3. The computer system of claim 2, wherein the processor configured to execute the instructions stored in the system memory to assemble the first data element and the second data element into the data view comprises the processor configured to execute the instructions stored in the system memory to:
derive a new value from the first data element and the second data element; and
include the derived new value in the data view.

4. The computer system of claim 2, wherein the processor configured to execute the instructions stored in the system memory to receive the query comprises the processor configured to execute the instructions stored in the system memory to receive a query from another computer system; and
furthering comprising returning the populated data view to the other computer system.

5. The computer system of claim 1, wherein the processor configured to execute the instructions stored in the system memory to select the data view for the query comprises the processor configured to execute the instructions stored in the system memory to select a pre-defined data view.

6. The computer system of claim 1, wherein the processor configured to execute the instructions stored in the system memory to receive the query comprises the processor configured to execute the instructions stored in the system memory to receive a query from a first tenant in a multi-tenant environment; and
wherein the processor configured to execute the instructions stored in the system memory to select the data view for the query comprises the processor configured to execute the instructions stored in the system memory to select the data view based on usage of the data view by a second tenant in the multi-tenant environment.

7. The computer system of claim 1, wherein the processor configured to execute the instructions stored in the system memory to select the data view for the query comprises the processor configured to execute the instructions stored in the system memory to automatically classify data elements included in the data catalog.

8. The computer system of claim 1, wherein the processor configured to execute the instructions stored in the system memory to select the data view for the query comprises the processor configured to execute the instructions stored in the system memory to automatically classify the one or more relationships between data elements in the first data source and the second data source.

9. The computer system of claim 1, wherein the processor configured to execute the instructions stored in the system memory to select the data view for the query comprises the processor configured to execute the instructions stored in the system memory to select the data view based on how one or more data elements included in the data catalog have previously been used in the data view.

10. A method for use at a computer system, the computer system including a processor and system memory, the method for forming data responsive to a query, the method comprising:
receiving the query, the query including one or more query terms;
accessing a data catalog, the data catalog storing data elements from a first data source and a second data source, the data catalog also storing relationships linking between a plurality of different and otherwise unconnected data elements in the first data source and in the second data source, the stored relationships stored in the data catalog in accordance with one or more signals used to maintain the data catalog;

classifying one or more relationships between data elements in the first data source and the second data source;

selecting a data view for the query based on classification of relationships between data included in the first data source and the second data source, wherein the data view is returned in response to the query; and populating the data view with a first data element and a second data element included in the data catalog, the first data element from the first data source and the second data element from the second data source, including:

determining that the first data element satisfies the one or more query terms;

accessing a relationship stored in the data catalog, the relationship linking the first data element to the second data element; and determining that the second data element is also related to the one or more query terms based at least on the relationship linking the first data element to the second data element.

11. The method of claim 10, wherein populating the data view with the first data element and the second data element included in the data catalog comprises assembling the first data element and the second data element into the data view based on the determination that the second data element is also related to the one or more query terms based at least on the relationship linking the first data element to a second data element.

12. The method of claim 11, wherein assembling the first data element and the second data element into the data view comprises:

deriving a new value from the first data element and the second data element; and including the derived new value in the data view.

13. The method of claim 11, wherein receiving the query comprises receiving the query from another computer system; and further comprising returning the populated data view to the other computer system.

14. The method of claim 10, wherein selecting a data view for the query comprises selecting a pre-defined data view.

15. The method of claim 10, wherein receiving a query comprises receiving a query from a first tenant in a multi-tenant environment; and wherein selecting a data view for the query comprises selecting the data view based on usage of the data view by a second tenant in the multi-tenant environment.

16. The method of claim 10, further comprising automatically classifying data elements included in the data catalog.

17. The method of claim 10, wherein classifying the one or more relationships comprises automatically classifying one or more relationships between data elements included in the data catalog.

18. The method of claim 10, wherein selecting a data view for the query further comprises selecting the data view based on how one or more data elements included in the data catalog have previously been used in the data view.

19. A computer program product for use at a computer system, the computer program product for implementing a method for forming data responsive to a query, the computer program product comprising one or more computer storage devices having stored thereon computer-executable instructions that, when executed by a processor, cause the computer system to perform the method, including the following:

receive the query, the query including one or more query terms;

access a data catalog, the data catalog storing data elements from a first data source and a second data source, the data catalog also storing relationships linking between a plurality of different and otherwise unconnected data elements in the first data source and in the second data source, the stored relationships stored in the data catalog in accordance with one or more signals used to maintain the data catalog;

select a data view for the query based on prior usage of data included in the data catalog to create other data views; and populate the data view with a first data element and a second data element included in the data catalog, the first data element from the first data source and the second data element from the second data source, including:

determine that the first data element satisfies the one or more query terms;

access a relationship stored in the data catalog, the relationship linking the first data element to the second data element; and determine that the second data element is also related to the one or more query terms based at least on the relationship linking the first data element to the second data element.

20. The computer program product of claim 19, wherein the computer-executable instructions that, when executed, cause the computer system to receive the query comprise computer-executable instructions that, when executed, cause the computer system to receive the query from another computer system;

wherein computer-executable instructions that, when executed, cause the computer system to populate the data view with the first data element and the second data element included in the data catalog comprise computer-executable instructions that, when executed, cause the computer system to assemble the first data element and the second data element into the data view based on the determination that the second data element is also related to the one or more query terms based at least on the relationship linking the first data element to a second data element; and further comprising computer-executable instructions that, when executed, cause the computer system to return the populated data view to the other computer system.

* * * * *